UNITED STATES PATENT OFFICE.

FERDINAND EUGENE CANDA, OF NEW YORK, N. Y.

MANUFACTURE OF SOLIDIFIED COMPOUND METALS.

SPECIFICATION forming part of Letters Patent No. 304,500, dated September 2, 1884.

Application filed May 16, 1883. Renewed December 29, 1883. Again renewed July 8, 1884. (Specimens.)

*To all whom it may concern:*

Be it known that I, FERDINAND EUGENE CANDA, of the city, county, and State of New York, have invented certain new and useful Improvements in the Manufacture of Solidified Compound Metals, of which the following is a full, clear, and exact description.

This invention has for its object the production of a solidified compound metal useful for general purposes.

My invention consists of a solidified compound metal composed of two or more metals or two or more alloys, or of one or more metals with one or more alloys, all solid at ordinary atmospheric temperatures, welded or soldered together, forming one compact, substantially solid mass; and it further consists in the method or methods of treating the material or materials and compacting, solidifying, and shaping the mass of which such compound metal is made, substantially as hereinafter set forth.

It likewise consists in covering or coating the divided-up metal or alloy with another metal or alloy; and it further consits in the use of a flux or fluxes for welding or soldering with heat and under pressure.

To enable others to make and use my invention, I will proceed to more minutely describe it.

I take two or more metals or two or more alloys, or one or more metals with one or more alloys in any desired proportions, which I grind or pulverize or granulate or otherwise divide into particles of any desired fineness. When thus ground, pulverized, granulated, or otherwise divided into more or less fine particles, the same, if copper or other metal or bronze or other alloys melting at high degrees of temperature are used, may be coated with a covering of tin or other metal or Babbitt metal or other alloy melting at lower degrees of temperature. This may be done by any of the known or suitable methods; but of the methods known for coating metals I prefer the following—that is to say: I saturate the divided particles of metals or alloys to be treated with diluted muriatic acid, in which metallic zinc has been dissolved. I then melt in a suitable vessel a quantity of tin or other metal or Babbitt metal or other alloy. I then slowly add the divided particles of metals or alloys to the melted metal or alloy, maintaining the heat while so adding and stirring briskly till the divided particles are coated. I then mix the ground, pulverized, granulated, or otherwise divided metal or metals, alloy or alloys, and those thus coated and prepared, or such of them to be treated, thoroughly together. The mixture is then ready for use, and may be put up in barrels or other packages for shipment or use, as required.

To use the mixture for making the solidified compound metal, I place in a die or mold the mixture to be treated, or a quantity of it sufficient to make any article desired to be made, adding a suitable flux or fluxes. The die or mold thus filled I then place in an oven or furnace and heat to a temperature sufficient to bring some or all of the divided particles, or the coating thereof, if coated as stated, to a soldering or welding heat. I then subject the material, while hot, to hydraulic or other pressure to perfect the welding or soldering, and to give the mass or compound metal solidity, compactness, and shape, after which it is removed from the die or mold, it being ready for use.

The material need not necessarily be heated in the die or mold, but may be in any suitable vessel and placed in the die or mold and pressed, as aforesaid, while hot. Neither is a flux absolutely necessary, but the welding will be facilitated by the use of fluxes, selected as best suited to the metals under treatment.

Having thus described my invention, I claim and desire to secure by Letters Patent—

1. A mixture or compound composed of two or more ground, pulverized, granulated, or otherwise divided metals, or of two or more alloys, or of one or more metals with one or more alloys, solid at ordinary atmospheric temperature, mixed in any desired proportions, such mixture or compound being in a loose form or condition, as and for the purposes specified.

2. A mixture or compound composed of two or more ground, pulverized, granulated, or otherwise divided metals, or of two or more alloys, or of one or more metals with one or more alloys, solid at ordinary atmospheric temperature, any or all of which are coated, mixed in any desired proportions, such mixture or compound being in a loose form or condition, as and for the uses mentioned.

3. A solidified compound metal composed of two or more metals or two or more alloys, or of one or more metals with one or more alloys, solid at ordinary atmospheric temperature, in any desired proportions, soldered or welded together, and forming one compact mass, substantially as and for the purposes mentioned.

4. The method of producing the within-described material or compound, which consists in first grinding, pulverizing, granulating, or otherwise dividing into particles two or more metals or two or more alloys, or one or more metals with one or more alloys, solid at ordinary atmospheric temperature, and mixing in any desired proportions, substantially as described.

5. The method herein described of making a material or compound from two or more metals or two or more alloys, or from one or more metals with one or more alloys, solid at ordinary atmospheric temperature, which consists in first grinding, pulverizing, granulating, or otherwise dividing into particles the metals or alloys and then coating or covering the same with other metals or alloys melting at lower degrees of temperature, substantially as herein specified.

6. The method herein described of making a solidified compound metal, which consists of first grinding, pulverizing, granulating, or otherwise dividing two or more metals or two or more alloys, or one or more metals with one or more alloys, solid at ordinary atmospheric temperature, then subjecting the whole to heat sufficient to bring some or all of the metals to a welding or soldering state, and afterward pressing the same while hot to perfect the welding or soldering, and to give the mass or compound metal compactness, solidity, and shape, substanially as set forth.

7. The method herein described of making a solidified compound metal, which consists of first grinding, pulverizing, granulating, or otherwise dividing two or more metals or two or more alloys, or one or more metals with one or more alloys, solid at ordinary atmospheric temperature, with the addition of a suitable flux or fluxes, then subjecting the whole to heat sufficient to bring some or all of the metals to a welding or soldering state, and afterward pressing the same while hot to perfect the welding or soldering, and to give the mass or compound metal compactness, solidity, and shape, substantially as set forth.

8. The method herein described of making a solidified compound metal, which consists in first grinding, pulverizing, granulating, or otherwise dividing into particles two or more metals or two or more alloys, or one or more metals with one or more alloys, solid at ordinary atmospheric temperature, then coating one or more of said metals or alloys with other metals or alloys melting at lower degrees of temperature, then subjecting the whole to heat sufficient to bring the metals or alloys, or the coating thereof, to a soldering or welding state, and afterward pressing the same while hot to perfect the welding or soldering, and to give the mass or compound metal compactness, solidity, and shape, substantially as herein set forth.

9. The method herein described of making a solidified compound metal, which consists in first grinding, pulverizing, granulating, or otherwise dividing into particles two or more metals or two or more alloys, or one or more metals with one or more alloys, solid at ordinary atmospheric temperature, with the addition of a suitable flux or fluxes, then coating one or more of said metals or alloys with other metals or alloys melting at lower degrees of temperature, then subjecting the whole to heat sufficient to bring the metals or alloys, or the coating thereof, to a soldering or welding state, and afterward pressing the same while hot to perfect the welding or soldering, and to give the mass or compound metal compactness, solidity, and shape, substantially as herein set forth.

10. The method herein described of making a solidified compound metal, which consists of first grinding, pulverizing, granulating, or otherwise dividing into particles two or more metals or two or more alloys, or one or more metals with one or more alloys, solid at ordiary atmospheric temperature, with or without a suitable flux or fluxes, then, if desired, coating one or more of said metals or alloys with other metals or alloys melting at lower degrees of temperature, then subjecting the whole in the die or mold to heat sufficient to bring the metals or alloys, or the coating thereof, if coated, to a soldering or welding state, and afterward pressing the same while hot to perfect the soldering or welding, and to give the mass or compound metal compactness, solidity, and shape, substantially as herein described.

FERDINAND EUGENE CANDA.

Witnesses:
J. MIDDLETON,
SOLON C. KEMON.